United States Patent
Bergstrom

[11] 3,718,528
[45] Feb. 27, 1973

[54] HEAT REFLECTING LAMINATE

[76] Inventor: Axel Emil Bergstrom, Fregattvagen 7, Lidingo, Sweden

[22] Filed: Aug. 9, 1971

[21] Appl. No.: 170,337

Related U.S. Application Data

[63] Continuation of Ser. No. 752,468, April 14, 1968, abandoned.

[30] Foreign Application Priority Data

Aug. 18, 1967 Sweden ..........................11626/67

[52] U.S. Cl. .......................161/1, 161/156, 161/214, 161/218
[51] Int. Cl. .................................................B44f 1/00
[58] Field of Search........161/87, 88, 89, 96, 98, 190, 161/213, 214, 231; 117/35, 71, 47 R, 160 R

[56] References Cited

UNITED STATES PATENTS

| | | | |
|---|---|---|---|
| 3,235,395 | 2/1966 | Scharf | 117/71 |
| 2,703,772 | 3/1955 | Keithly | 117/71 |

FOREIGN PATENTS OR APPLICATIONS 924,636   4/1963   Great Britain.........................161/213

OTHER PUBLICATIONS

C & EN Mar. 25, 1963 pp. 48 and 49

Primary Examiner—William A. Powell
Assistant Examiner—James J. Bell
Attorney—Waters, Roditi, Schwartz & Nissen

[57] ABSTRACT

A radiation filter laminate material which transmits visible light and reflects heat radiation, comprising a plastic substrate on which is precipitated catalytically at least one coating of a metal or metals which impart to the material the properties of reflecting heat radiation to a greater degree than it reflects visible light, and which is also provided with a textile reinforcing material adhered to one or both sides thereof.

5 Claims, No Drawings

HEAT REFLECTING LAMINATE

This application is a continuation of Ser. No. 752,468, filed Apr. 14, 1968 now abandoned.

The invention is concerned with a heat reflecting laminate, and more specifically with a laminate comprising one or more catalytically precipitated metal layers, which present high reflection ability in the infrared spectrum, on a transparent, translucent or opaque plastic substrate, suitably in sheet form, and that the plastic sheet provided with the heat reflecting layer is laminated with a reinforcing sheet of textile material on one or both sides of the sheet.

It is previously known to coat, for instance, glass with infrared reflecting layers of catalytically precipitated metals, for instance from Swedish Pat. No. 153,976 in which is described an optical filter constructed of a number of glass layers on which is applied one or more catalytically precipitated layers of metal capable of reflecting infrared radiation to a greater extent than they are capable of reflecting visible light. According to this patent the layers is preferably applied on to a surface of the multiglass structure which faces the direction of the radiation. Previously developments in this field have included making the glass heat absorbent by adding substances, such as $Fe_2O_3$, to the glass material. The addition of such admixtures considerably increases the absorption properties of the finished glass to infrared light. Different types of metal precipitations have been applied, although without utilizing the selective infrared reflection as shown in the Swedish Pat. No. 153,976.

The previously known arrangements for obtaining heat reflection have thus required the production of special types of glass or the use of expensive or difficulty produced multi-glass structures. These circumstances have lead to attempts to develop a more simple type of optical filtering, which can be used without any particular installation means, as are required in the case of glass filters. The present invention is concerned with a solution to this problem. According to the invention a transparent material is obtained which can be readily used for excluding non-desirable infrared radiation from, for instance, domestic or business localities. The laminate according to the invention can be used to produce roller blinds, persian-blinds, curtains and tents etc. The material can also be used as a sun-roof or a tent-canvas. Since the material can be used in the form of a curtain, which will permit light to pass therethrough but not heat, the advantage is gained that the need for artificial light sources is also reduced since the material can be given a transparent or translucent coating in such instances when it is otherwise necessary to use window openings or even construct without windows. This is particularly true for those countries where buildings are traditionally build with very thick walls and small windows, to exclude heat.

The laminate can to advantage be colored and designed so that a patterned product is obtained, for instance by using colored sheets or colored or patterned reinforcing textiles.

The invention is characterized in that a sheet of plastic material is catalytically coated with a thin metallic layer and then reinforced with a textile material on either side or on one side only.

The plastic sheet may, in principle, be any plastic sheet available commercialy but transparent plastics are to be preferred. Among these, sheets of linear polyesters have admirably suitable qualities. Such sheets of plastic are retained under different trade marks, e.g., Mylar (duPont), Melinex (ICI) and Hostaphan (Kalle & Co.). Among the remaining usable types of sheet material can be mentioned viscose films, polyvinylidene chloride (e.g., Saran (Dow Chemical)), cellulose acetate, polyolefine, polyamide and polysterene-films, and in such instances where particularly high heat durability is required also fluor carbon plastic films.

The plastic film is coated with a thin metallic layer by catalytically precipitating according to the invention. This process is described in the Swedish Pat. No. 153.976. When effecting a catalytical precipitation the film is first cleaned in a conventional manner in a bath containing sulphonated fatty alcohols (of the type Teepool), whereafter the sheet is carefully rinsed. Subsequent to cleaning the sheet the surface is activated by spraying or immersion in a bath of activating salt, e.g., a salt of titanium, tin or cobalt. Usually tin (II) chloride is to be preferred. After activating the sheet a metal is precipitated catalytically on the activated plastic surface. This can be effected by immersing or spraying a salt solution of platina metal or gold. Subsequent to rinsing the sheet provided with the catalyst layer, which is very thin and invisible to the naked eye, is immersed in a bath containing one or more salts of the metal which is to constitute the tin layer, said metal being characterized in that it can selectively reflect infrared radiation. The bath also contains a reduction agent, which may be an inorganic and/or organic type of agent. An exemple of inorganic reduction agents is sodium hydrophosphate and the organic reduction agents may for instance be hydrozine. A preferred bath when precipitating, for instance, nickel is a mixture of nickel sulphate, nickel formiate, sodium hypophosfite and hydrazine. The temperature during the precipitating process shall lie between 20°–100°L, suitably between 40°–60°C, the time taken to effect the process being between 30 seconds and 50 minutes. The coated sheet is then rinsed and dried.

The film provided with the catalytically precipitated coating is then provided with a reinforcing material which is secured thereto by means of an adhesive. The film is suitably reinforced by applying the adhesive to the plastic sheet using a screen roller, i.e., a roller which applies the adhesive spot-wise, whereafter the reinforcing textile material is applied to the sheet and pressed fast thereto. Any type of adhesive can be used; the only condition being that it is capable of gluing the metallized plastic surface to the reinforcing material. A transparent adhesive, however, is preferably chosen so as not to impair unnecessarily the reflecting properties of the plastic sheet. A preferred adhesive is a polyurethane adhesive, but also polyvinylacetyl and polycyanacrylate adhesive can be used. The reinforcing material is suitably a textile material in the form of a fabric or a fiber non-woven fabric. The invention permits a wide variety of materials in this respect, although a relatively wide mesh fabric is to be preferred, in order to obtain the greatest possible free reflection surface.

The most suitable reinforcing material is a metallized textile fabric. The metallization process can be effected with the same metal and by the same method as is used for metallizing the plastic sheet. The use of a metallized fabric is to be preferred for several reasons. The metallization gives a greater total degree of reflection in the infrared spectrum since the losses due to absorption in the fabric are reduced thereby. Furthermore, the transparency is noticeably increased if a metallized reinforcing fabric is used, particularly in the case of side illumination. A further advantage is that all tendencies to electrostatic charging can be avoided, which is of importance since the material tends to become less dirty thereby, and in that the laminate can be used without risk in locations wherein some risk of explosion exists.

As can be seen from Swedish Pat. No. 153,976 certain metals possess the property of being capable of selectively reflecting infrared radiation (i.e. over $\lambda = 0.78$ $\mu$m), whereas the reflection in the visible range is relatively smaller.

Radiation which impinges upon a metal surface is divided at the surface into a portion which is reflected, and a portion which is absorbed. If the metal layer is thin the penetrating radiation is not completely absorbed, but a certain portion will be transmitted. It is, according to the invention, of importance to select a metal where the relationship between reflection and absorption in the infrared area is as high as possible since the absorbed radiation heats the laminate which, by secondary radiation, then re-radiates a large quantity of the filtered infrared radiation.

The metal coating should have good electrical conductivity since the depth of penetration of the radiation is then less, simultaneously as the reflection ability increases which, as previously mentioned, is to be desired.

According to known physical laws the following relation (1) can be constructed for $K_r$ (reflection ability) of a certain type of metal.

$$K_r = 1 - K(\mu/\sigma\lambda) \quad (1)$$

In the formula (1) $K$ is a natural constant, $\mu$ the permeability, $\sigma$ the conductivity ($i\Omega m$) and finally $\lambda$ the wave length. The validity of the above formula is essentially restricted to the infrared spectral region.

If the permeability is high and the light thus penetrates relatively deeply into the layer a large portion of the radiation will be absorbed as heat. If, for instance, it is intended to filter away infrared radiation the filter medium will thus be heated at the outer layer, resulting in that heat is emitted therefrom. It will be seen from the formula that the higher the permeability the lower the reflection ability. The conductivity, on the other hand, should be as great as possible in order to give $K_r$ the highest possible value. All dimensions in the formulae are in accordance with the SI-system (MKSA). Thus by suitable choice of metal and layer thickness it is possible to obtain a certain advantageous characteristic of the layer.

The following relations are known from the science of optics.

$$K_r = (n - 1/n + 1)^2 \quad (2)$$

In formula 2 $n$ is the refraction index for a certain wave length relative to the surrounding medium.

Thus, with knowledge of the refraction index the reflection ability of different metals can be calculated from formula 2. Nickel can be mentioned as an illustrative example. At $\lambda = 1$ $\mu$m nickel has a refraction index (n) of 2.63. The $K_4$-value is thus 0.20, from which it follows that 20 percent reflection is obtained. If $\lambda$ is, instead, set at 2.25 $\mu$m $n$ will be 3.95. Formula 2 gives $K_r = 0.355$ or a reflection of 35.5 percent if irridium is selected instead of a much higher value concerning reflection is obtained. At 1 $\mu$m Ir has an n-valve of 3.6 and at 2.25 $\mu$m $n$ is 6.5 $\mu$m. These valves give 42 and 53 percent respectively. At 3 $\mu$m Ir has an $n$-value of 8, from which is obtained a 60 percent reflection. In comparison it can be mentioned that a very usual type of glass has a refraction index of 1.51, from which, according to formula (2) a reflection of 4 percent is obtained. It is apparent from this that the choice of metal is of great importance. Finally, it is also possible to express the field penetration in metals from the known physical relation $$x = K \quad (3)$$

where $x$ is the field penetration while remaining symbols have the definition given above in connection with formula (1). This relation, which discloses the penetration depth, also affords the possibility of assessing the absorption by heat energy; this stands in direct correlation with the penetration depth. Thus, the formula discloses that a high conductivity results in a small field penetration and thus low absorption.

The choice of metal, metal alloy or metal composition is thus of essential importance to the invention.

However, other properties are to be found which can render a metal as suitable as a coating material. Such properties include uneven transmission within the visible spectral range. Gold, for instance, shows a very high absorption of blue light, and hence a filter presenting a layer of gold obtains a certain degree of displacement toward the red spectral. This is the same with copper. These metals can only be used in combination with another metals presenting suitable complementary characteristics. Certain metals are unsuitable for reasons of production or corrosion. Certain metals are very difficult to precipitate, cobalt being an example of one such metal. Cobalt has suitable reflecting properties in infrared but is difficulty precipitated in thick layers, and must be placed in very thin layers upon, for instance, a nickel layer in which cobalt diffuses upon treatment by heat. Suitable alloys which may be used are, for instance, Ir—Ni, Co—NI, Ir—Co, Au—Co, Au—Ni, and Sn—Au. The choice of suitable coating metals is restricted, according to the foregoing tabels to metals having a high refraction index in the infrared range and simultaneously a high conductivity, and to alloys or composite compositions thereof. Examples of such metals are Ir, Co, Mn, Pl, Pd, Si, Ta or Zn, of which Ir, Pd and Zn are to be preferred. Thus, by employing said metals it is possible to construct an optical filter on a light-permeable substrate, e.g., plastic sheets, suitably so that one or more layers are applied on the same or different surfaces of the filter. These layers contain at least one metal which presents high reflection ability in the infrared and comparatively low reflection of visible light, and possibly further combinations of metallic components therein which complement said properties so that the filter in its entirety obtains the required properties.

I claim:

1. An infra-red reflecting material comprising a laminate which is transparent to visible light and consists of a plastic substrate, an infra-red reflecting layer on said substrate, and a reinforcing fabric material, said infra-red reflecting layer comprising a catalytic layer of at least one of the metals gold and platinum deposited directly on said substrate on a salt-activated surface thereof, and superposed directly on said catalytic layer, a light permeable but infra-red reflecting coating of at least one of the metals Ir, Co, Mn, Pt, Ta, Pd and Zn.

2. A reflecting material as claimed in claim 1 comprising a coating of said infra-red reflecting layer on said reinforcing fabric material.

3. A reflecting material as claimed in claim 2 comprising transparent adhesive means joining said reinforcing fabric material to said substrate.

4. A reflecting material as claimed in claim 3 wherein said metals of said reflecting coating are Ir, Pd, or Zn.

5. A reflecting material as claimed in claim 1 wherein said reinforcing fabric material is secured on opposite sides of the substrate with the infra-red reflecting layer.

* * * * *